US011847178B2

(12) United States Patent
Ramos et al.

(10) Patent No.: US 11,847,178 B2
(45) Date of Patent: Dec. 19, 2023

(54) DOCUMENT RE-FINDING SYSTEM

(71) Applicant: Microsoft Technology Licensing, LLC, Redmond, WA (US)

(72) Inventors: Gonzalo A. Ramos, Kirkland, WA (US); Jin A. Suh, Seattle, WA (US); Shiqian Rachel Ng, Seattle, WA (US); Christopher Alan Meek, Kirkland, WA (US); Haekyu Park, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 17/683,595

(22) Filed: Mar. 1, 2022

(65) Prior Publication Data

US 2023/0281259 A1 Sep. 7, 2023

(51) Int. Cl.
*G06F 16/23* (2019.01)
*G06F 16/2455* (2019.01)
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .................. G06F 16/9535; G06F 16/9538
See application file for complete search history.

(56) References Cited

U.S. PATENT DOCUMENTS

| 2002/0156832 | A1 | 10/2002 | Duri et al. | |
| 2010/0153428 | A1* | 6/2010 | Schechter | G06F 16/9535 707/E17.014 |
| 2020/0042567 | A1* | 2/2020 | Birch | G06F 40/134 |
| 2020/0380051 | A1* | 12/2020 | Sadahiro | G06F 16/9537 |

OTHER PUBLICATIONS

Adar, et al., "Large Scale Analysis of Web Revisitation Patterns", In Proceedings of the SIGCHI Conference on Human Factors in Computing Systems, Apr. 5, 2008, pp. 1197-1206.
Aula, et al., "Information Search and Re-access Strategies of Experienced Web Users", In Proceedings of the 14th International Conference on World Wide Web, May 10, 2005, pp. 583-592.
Bennett, et al., "Overview of the Special Issue on Contextual Search and Recommendation", In ACM Transactions on Information Systems, vol. 33, Issue 1, Mar. 17, 2015, 7 Pages.
(Continued)

*Primary Examiner* — Apu M Mofiz
*Assistant Examiner* — Oscar Wehovz

(57) ABSTRACT

A document re-finding system generates embeddings for concept clips provided by a user, the concept clips defining a concept for searching for content of interest to the user in a plurality of documents previously seen by the user. The re-finding system determines semantic relationships between the concept and document clips, related to respective document among the plurality of documents, based on the concept embedding and embeddings generated for the document clips. A graphical user interface depicting the semantic relationships is rendered to the user and is operable to enable re-finding a document, among the plurality of documents, having the content of interest to the user.

20 Claims, 12 Drawing Sheets

(56) References Cited

OTHER PUBLICATIONS

Boehner, et al., "How HCI Interprets the Probes", In Proceedings of the SIGCHI Conference on Human Factors in Computing Systems, Apr. 28, 2007, pp. 1077-1086.

Brooke, John, "SUS: A Retrospective", In Journal of Usability Studies, vol. 8, Issue 2, Feb. 1, 2013, pp. 29-40.

Cao, et al., "NASA TLX: Software for Assessing Subjective Mental Workload", In Journal of Behavior Research Methods, vol. 41, Issue 1, Feb. 2009, pp. 113-117.

Capra, Robert G., III, "An Investigation of Finding and Refinding Information on the Web", In Dissertation Submitted to Virginia Polytechnic Institute and State University for the degree of Doctor of Philosophy, Feb. 16, 2006, 187 Pages.

Chen, et al., "Generalized Second Price Auction with Probabilistic Broad Match", In Proceedings of the Fifteenth ACM Conference on Economics and Computation, Jun. 8, 2014, pp. 39-56.

Coren, et al., "Principles of Perceptual Organization and Spatial Distortion: The Gestalt Illusions", In Journal of Experimental Psychology: Human Perception and Performance, vol. 6, Issue 3, Aug. 6, 1980, pp. 404-412.

Cutrell, et al., "Fast, Flexible Filtering with Phlat", In Proceedings of the SIGCHI Conference on Human Factors in Computing Systems, Apr. 22, 2006, pp. 261-270.

Dumais, et al., "Stuff I've Seen: A system for Personal Information Retrieval and Re-Use", In Proceedings of the 26th Annual International ACM SIGIR Conference on Research and Development in Information Retrieval, Jul. 28, 2003, pp. 72-79.

Dar, et al., "Bid Optimization for Broad Match Ad Auctions", In Proceedings of the 18th International Conference on World Wide Web, Apr. 20, 2009, pp. 231-240.

Fruchterman, et al., "Graph Drawing by Force-Directed Placement", In Journal of the Software: Practice and Experience, vol. 21, Issue 11, Nov. 1991, pp. 1129-1164.

Yi, et al., "Dust & Magnet: Multivariate Information Visualization using a Magnet Metaphor", In Journal of Information Visualization, vol. 4, Issue 4, Dec. 4, 2005, pp. 239-256.

Wallis, et al., "Effects of Temporal Association on Recognition Memory", In Proceedings of the National Academy of Sciences, vol. 98, Issue 8, Apr. 10, 2001, pp. 4800-4804.

Kang, et al., "Colleges and Universities' Use of the World Wide Web: A Public Relations Tool for the Digital Age", In Journal of Public Relations Review, vol. 32, Issue 4, Nov. 1, 2006, pp. 426-428.

Kobourov, et al., "Gestalt Principles in Graph Drawing", In International Symposium on Graph Drawing, Sep. 24, 2015, pp. 558-560.

Koenemann, et al., "A Case for Interaction: A Study of Interactive Information Retrieval Behavior and Effectiveness", In Proceedings of the SIGCHI Conference on Human Factors in Computing Systems, Apr. 13, 1996, pp. 205-212.

Landhuis, Esther, et al., "Scientific Literature: Information Overload", In Journal of Nature, vol. 535, Issue 7612, Jul. 21, 2016, pp. 457-458.

Makela, Eetu, "Survey of Semantic Search Research", In Proceedings of the Seminar on Knowledge Management on the Semantic Web, 2005, 11 Pages.

Mangold, Christoph, "A Survey and Classification of Semantic Search Approaches", In International Journal of Metadata, Semantics and Ontologies, vol. 2, Issue 1, Jan. 1, 2007, pp. 23-34.

Marchionini, Gary, "Toward Human-Computer Information Retrieval", In Bulletin-American Society for Information Science and Technology, vol. 32, Issue 5, Jun. 2006, pp. 20-22.

Masuda, et al., "Semantic Search Based on the Online Integration of NLP Techniques", In Journal of Procedia—Social and Behavioral Sciences, vol. 27, Jan. 1, 2011, pp. 281-290.

Morris, et al., "SearchBar: A Search-Centric Web History for Task Resumption and Information Re-Finding", In Proceedings of the SIGCHI Conference on Human Factors in Computing Systems, Apr. 5, 2008, 10 Pages.

Muramatsu, Jack, "Transparent Queries: Investigation Users' Mental Models of Search Engines", In Proceedings of the 24th Annual International ACM SIGIR Conference on Research and Development in Information Retrieval, Sep. 9, 2001, pp. 217-224.

Ng, et al., "Understanding and Supporting Knowledge Decomposition for Machine Teaching", In Proceedings of the ACM Designing Interactive Systems Conference, Jul. 6, 2020, pp. 1183-1194.

Nikishina, et al., "RusNLP: Semantic Search Engine for Russian NLP Conference Papers", In Proceedings of the International Conference on Analysis of Images, Social Networks and Texts, Jul. 5, 2018, 10 Pages.

Rachatasumrit, et al., "ForSense: Accelerating Online Research Through Sensemaking Integration and Machine Research Support", In Proceedings of the 26th International Conference on Intelligent User Interfaces, Apr. 14, 2021, pp. 608-618.

Reimers, et al., "Sentence-BERT: Sentence Embeddings using Siamese BERT-Networks", In Repository of arXiv:1908.10084v1, Aug. 27, 2019, 11 Pages.

Jo, et al., "A Cross-Cultural Study of the World Wide Web and Public Relations", In Corporate Communications: An International Journal, vol. 10, Issue 1, Mar. 1, 2005, pp. 24-40.

Shahaf, et al., "Information Cartography: Creating Zoomable, Large-Scale Maps of Information", In Proceedings of the 19th ACM SIGKDD International Conference on Knowledge Discovery and Data Mining, Aug. 11, 2013, pp. 1097-1105.

Shahaf, et al., "Metro Maps of Science", In Proceedings of the 18th ACM SIGKDD International Conference on Knowledge Discovery and Data Mining, Aug. 12, 2012, pp. 1122-1130.

Tyler, et al., "Large Scale Query Log Analysis of Re-Finding", In Proceedings of the Third ACM International Conference on Web Search and Data Mining, Feb. 4, 2010, pp. 191-200.

Suh, et al., "AnchorViz: Facilitating Semantic Data Exploration and Concept Discovery for Interactive Machine Learning", In ACM Transactions on Interactive Intelligent Systems, vol. 10, Issue 1, Aug. 9, 2019, 38 Pages.

Teevan, Jaime, "The Re-Search Engine: Helping People Return to Information in Dynamic Information Environments", In PhD, Massachusetts Institute of Technology, 2007, 77 Pages.

Grootendorst, Maarten, "KeyBERT: Minimal Keyword Extraction with BERT", Retrieved From : https://zenodo.org/record/4461265#.Yd1XhNFBw2w, Jan. 25, 2021, 4 Pages.

White, Ryen W., "Interactions with Search Systems", In Publication of Cambridge University Press, Mar. 14, 2016, 541 Pages.

White, et al., "The World Wide Web as a Public Relations Medium: The Use of Research, Planning, and Evaluation in Web Site Development", In Journal of Public Relations Review, vol. 25, Issue 4, Dec. 1, 1999, pp. 405-419.

Hill, et al., "Public Relations Practitioners' Perception of the World Wide Web as a Communications Tool", In Journal of Public Relations Review, vol. 26, Issue 1, Mar. 1, 2000, pp. 31-51.

Sobotka, et al., "Investigation of Long Term Recognition and Association Memory in Unit Responses from Inferotemporal Cortex", In Journal of Experimental Brain Research, vol. 96, Issue 1, Sep. 1, 1993, pp. 28-38.

"International Search Report and Written Opinion Issued in PCT Application No. PCT/US2023/011915", dated Apr. 18, 2023, 12 Pages.

UCLA, VCLA, "Ontology Graph", Retrieved from the Internet: URL:https://www.youtube.com/watch?v=OU2g1QDHQIs, Jun. 6, 2016, 2 Pages.

\* cited by examiner

DOCUMENT RE-FINDING SYSTEM

BACKGROUND

Searching for content in various electronic documents, such as webpages, electronic files, emails, etc., is a task performed by users of various applications on a daily basis. In some cases, search for content involves re-finding documents that have been previously encountered by the user. For example, a user may wish to re-find a webpage that the user has previously explored. As another example, a user may wish to re-find an email or a document that the user has previously viewed. Typical searching systems allow the user to search for such documents by using keywords obtaining search results retrieved based on the keywords. However, re-finding documents using keywords is sometimes difficult because the user often does not sufficiently remember the content of the document to provide exact keywords for searching for the document.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a re-finder system may be configured to assist users in re-finding document having content of interest to the users. In aspects, the re-finder system may allow the user to define concepts that may include clips, such as chunks of documents, images, text paragraphs, etc., that may be related to the content of interest to the user. The re-finder system may determine semantic relationships between the concepts defined by the user and clips of documents previously seen by the user, and may visually depict the semantic relationships to the user. For example, the re-finder system may display a multidimensional canvas showing representations of document clips and representations of concepts, in which the representations of document clips are positioned relative to locations of the representations of concepts according to the semantic relationships between the corresponding document clips and the corresponding concepts. The user may thus browse through document clips based on the semantic relationships between the document clips and the concepts, for example to find document clips that are semantically similar to and/or semantically dissimilar from respective ones of the concepts. In some aspects, the re-finder system may provide an interactive graphical user interface that may allow the user to interactively reposition the representations of concepts in the graphical user interface, and may update positions of the representations of document clips based on the changing locations of the representations of concepts in the graphical user interface. Thus, as the user is interactively repositioning a representation of a concept in the graphical user interface, representation of document clips that are relatively more semantically similar to the concept may be visually attracted to the representation of the concept in the graphical user interface and representations of document clips that are relatively less semantically similar to the concept may be visually repelled from the representation of the concept. The user may thus reposition the representations of concepts in the graphical user interface to organize the document clips according to document content that may conceptually be of interest to the user. These and other techniques described herein may enable the user to re-find documents that would have been more difficult or not possible to re-find using traditional re-finding techniques, such as using traditional keyword searches to locate documents having the content of interest to the user.

In aspects, a method for assisting users in re-finding documents is provided. The method includes generating embeddings for document clips related to respective documents among a plurality of documents. The method also includes receiving a first set of concept clips defining a first concept for searching for content of interest to a user in the plurality of documents. The method additionally includes generating embeddings for respective concept clips in the first set of concept clips, and generating a first concept embedding based on a combination of the embeddings generated for the respective concept clips in the first set of concept clips. The method further includes determining semantic relationships between the first concept and the document clips based on i) the embeddings generated for the document clips and ii) the concept embedding, and generating a graphical user interface depicting the semantic relationships between the first concept and the document clips. The method additionally includes causing display of the graphical user interface to be rendered at a client device, wherein the graphical user interface is operable to enable re-finding a document, among the plurality of documents, having the content of interest to the user.

In further aspects, a system is provided. The system for assisting users in re-finding documents is provided. The system comprises one or more computer readable storage media and
program instructions stored on the one or more computer readable storage media that, when executed by at least one processor, cause the at least one processor to perform operations. The operations include generating, using a machine learning model, embeddings for document clips related to respective documents among a plurality of documents. The operations also include receiving a first set of concept clips defining a first concept for searching for content of interest to a user in the plurality of documents. The operations additionally include generating, using the machine learning model, embeddings for respective concept clips in the first set of concept clips, and generating a first concept embedding based on a combination of the embeddings generated for the respective concept clips in the first set of concept clips. The operations further include determining semantic relationships between the first concept and the document clips based on i) the embeddings generated for the document clips and ii) the concept embedding, and generating a graphical user interface depicting the semantic relationships between the first concept and the document clips. The operations additionally include causing display of the graphical user interface to be rendered at a client device, wherein the graphical user interface is operable to enable re-finding a document, among the plurality of documents, having the content of interest to the user.

In still further aspects, a computer storage medium is provided. The computer storage medium comprises computer executable instructions, which when executed by at least one processor, perform a method. The method includes generating embeddings for document clips related to respective documents among a plurality of documents. The method also includes receiving a first set of concept clips defining a first concept for searching for content of interest to a user in the plurality of documents. The method further includes generating embeddings for respective concept clips in the first set of concept clips, and generating a first concept embedding based on a combination of the embeddings generated for the respective concept clips in the first set of concept clips. The method further still includes determining semantic relationships between the first concept and the document clips based on i) the embeddings generated for the document clips and ii) the concept embedding, and generating a graphical user interface depicting the semantic relationships between the first concept and the document clips. The method additionally includes causing display of the graphical user interface to be rendered at a client device, wherein the graphical user interface is operable to enable re-finding a document, among the plurality of documents, having the content of interest to the user.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
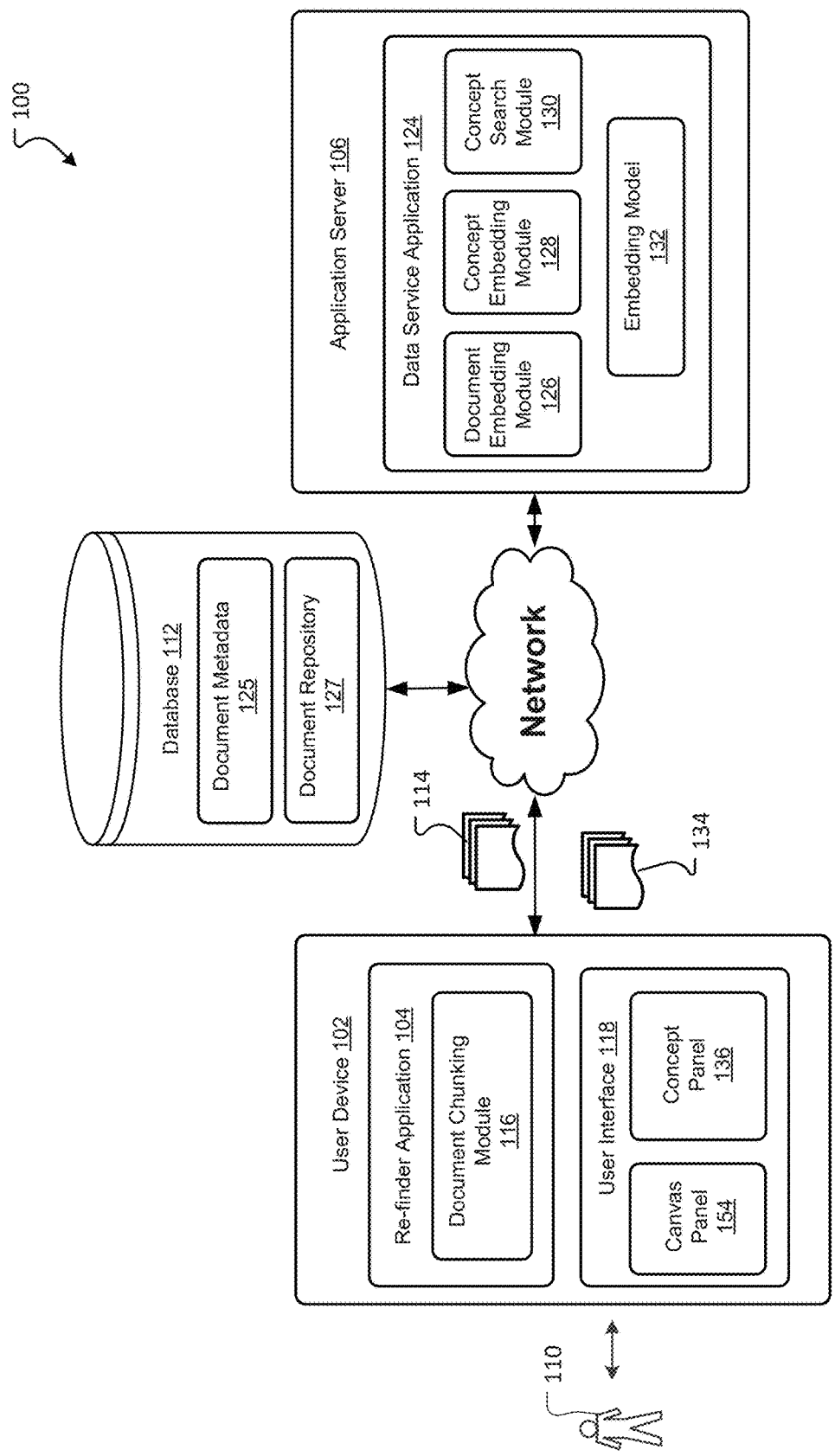
FIG. 1 illustrates an overview of an example system in which re-finding techniques may be utilized, in accordance with aspects of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects disclosed herein may be practiced as methods, systems, or devices. Accordingly, aspects disclosed herein may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a re-finder system may be configured to assist users in re-finding documents having content of interest to the users. For example, the re-finder system may be configured to assist a user in re-finding webpages with particular content previously seen by the user. Although for purposes of ease of explanation, the re-finder system is generally described herein in the context of re-finding webpages previously seen by a user, the re-finder system may be configured to additionally or alternatively assist users in re-finding documents other than webpages previously seen be the users. For example, the re-finder system may be configured to assist users in re-finding emails, chat message, documents stored in a file repository (e.g., document stored in a computer file system and/or on the cloud), etc. previously encountered by the users.

In aspects, the re-finder system may allow the user to define concepts that may include clips, such as parts of documents, images, text paragraphs, etc., that may be related to the content of interest to the user. The re-finder system may determine semantic relationships between the concepts defined by the user and clips of documents previously seen by the user, such as webpages in the browsing history of the user. In aspects, the re-finder system may generate (e.g., using a machine learning model, such as a transformer model though one of skill in the art will appreciate that other types of models may be used) semantic embeddings for the concepts defined by the user and for the clips of documents previously seen by the user, and may determine semantic relationships between the concepts and the document clips based on calculated distances between the semantic embeddings generated for the concepts and the semantic embeddings generated for the clips of documents previously seen by the user. The re-finder system may then display the relationships between the concepts and the document clips to the user. For example, the re-finder system may provide a graphical user interface displaying visual representations of the document clips and visual representations of the concepts, where the visual representations of the document clips are positioned relative to the visual representations of the concepts based on sematic relationships between the document clips and the concepts. The user may thus visually inspect documents based on the semantic similarities and/or dissimilarities between the document clips and the concepts to potentially re-find the document of interest to the user. In some aspects, the re-finder system may allow the user to interactively reposition the representations of concepts in the graphical user interface and may dynamically update locations of the representations of document clips based on the changing locations of the representations of the concepts in graphical user interface. Thus, as the user is interactively repositioning a representation of a concept in the graphical user interface, representations of document clips that are relatively more semantically similar to the concept may be visually attracted to the representation of the concept in the graphical user interface and representations of document clips that are relatively less semantically similar to the concept may be visually repelled from the representation of the concept in the graphical user interface. The user may thus reposition the representations of concepts in the graphical user interface to organize the document clips according to document content that may conceptually be of interest to the user. These and other techniques described herein may enable the user to re-find documents that would have been more difficult or not possible to re-find using traditional re-finding techniques, such as using traditional keyword searches to locate documents having the content of interest to the user.

FIG. 1 illustrates an overview of an example system 100 in which re-finding techniques described herein may be utilized, in accordance with aspects of the present disclosure. The system 100 may include a user device 102 that may be configured to run or otherwise execute a re-finder application 104. Examples of the user device 102 include, but are not limited to, a laptop, a tablet, a smartphone, and the like. The re-finder application 104 may be a client application that may be configured to assist a user 110 of the user device 102 in re-finding electronic documents that may have been previously seen by the user 110. As an example, the re-finder application 104 may assist the user 110 in re-finding webpages previous seen by the user 110. In other examples, the re-finder application 104 may additionally or alternatively assist the user 110 in re-finding other types of documents, such as electronic file documents, emails, chats, etc. The re-finder application 104 be a client application that may be provided, for example, as an extension to a browsing application, such as a web browsing or a file browsing application. In some aspects, the re-finder application 104 may be a client application provided as an extension to another type of application in which searching for particular content may be needed or desired. For example, the re-finder application 104 may be provided as a part of, or an extension to, an email application, a chat application, a document repository application, etc. In other aspects, the re-finder application 104 may be a standalone application. In some examples, the re-finder application 104 may be a web application, where such application 104 may run or otherwise execute instructions within a web browser. In some examples, the application 104 may additionally or alternatively include a native client application residing on the user device 102.

The user device 102 may be communicatively coupled to an application server 106 via a communication network 108. The communication network 108 may be a wide area network (WAN) such as the Internet, a local area network (LAN), or any other suit able type of network. The communication network 108 may be single network or may be made up of multiple different networks, in some examples. The system 100 may also include a database 112 that may be communicatively coupled to the application server 106 and/or to the user device 102 via the communication network 108. In other aspects, the database 112 may be coupled to the application server 106 and/or to the user device 102 in other suitable manners. For example, the database 112 may be directly connected to the application server 106, or may be included as part of the application server 106, in some examples. The database 112 may be a single database or may include multiple different databases.

In aspects, the re-finder application 104 may enable the user 110 to re-find documents (e.g., webpages) previously encountered by the user 110, for example, by accessing the document on the user device 102 or on another device, based on semantic relationships between document clips related to content of the documents previously encountered by the user 110 and concepts that may be defined or otherwise provided by the user 110. In this way, the re-finder application 104 may enable the user 110 to re-find the document without remembering the exact content of the document and without having to provide exact keywords for searching for the document. Although for purposes of ease of explanation, the re-finder application 104 is generally described herein in the context of re-finding webpages previously encountered by a user, the re-finder application 104 may be configured to additionally or alternatively assist users in re-finding documents other than webpages previously encountered be the users. For example, the re-finder application may be configured to assist users in re-finding emails, chat message, documents stored in a file repository (e.g., document stored in a computer file system and/or on the cloud), etc. previously encountered by the users.

In aspects, to enable the user 110 to subsequently re-find webpages encountered by the user 110, the re-finder application 104 may be configured to generate document clips 114 related to content of the webpages as the webpages are encountered by the user 110. In an aspect, the re-finder application 104 may include a document chunking module 116 configured to generate the document clips 114 for the webpages encountered by the user 110. The document clips 114 generated for a webpage may include, for example, document chunks containing text (e.g., text paragraphs) that the document chunking module 116 may parse out from the webpage. In some aspects, the document chunking module 116 may discard some document chunks extracted from the webpage. For example, the document chunking module 116 may discard duplicate chunks containing same content extracted from the webpage. As another example, the document chunking module may discard document chunks that are too small, such as document chunks with a number of characters or words below a particular (e.g., predetermined) low threshold and/or document chunks that are too large, such as document chunks having a number of characters or words above a particular (e.g., predetermined) high threshold. In addition to or instead of text parsed out from a webpage, the document clips 114 generated for the webpage may include information other than text parsed out from the webpage. For example, the document clips 114 may include images extracted from the webpage. As another example, the document clips 114 may include information related to structure or feel of the webpage. For example, the document clips 114 may include metadata information such as information indicating a length of the webpage, information indicating a color (e.g., a background color) used on the webpage, information indicating types, colors, sizes, etc. of fonts used on the webpage, information indicating a number of sections or parts (e.g., tabs, etc.) on the webpage, etc.

In some aspects, the document clips 114 may include additional information that is not obtained from the webpage. For example, the re-finder application 104 may allow the user 110 to provide (e.g., enter into a graphical user interface 118 of the re-finder application 104) additional information, such as notes or other annotations, about the webpage, e.g., when the webpage is encountered by the user 110. The user 110 may thus add notes or other annotations, for example, that may help the user 110 to subsequently re-find the webpage. In examples, the re-finder application 104 may allow the user 110 to provide global annotations describing content and/or feel of the webpage as a whole and/or may allow the user 110 to provide local annotations describing content and/or feel of specific sections, paragraphs, images, etc. on the webpage. In aspects, the document chunking module 116 may include such annotations provided by the user 110 in the document clips 114 generated for the webpage. The document chunking module 116 may additionally or alternatively use the annotations provided by the user 110 to prioritize parts (e.g., chunks) of the webpage to be included in the document clips 114. For example, the user 110 may explicitly indicate importance of a particular part of the webpage when providing an annotation of the particular part of the webpage and/or the document chunking module 116 may implicitly determine importance of a particular part of the webpage based on annotations provided by the user 110 for the particular part of the webpage. The document chunking module 116 may then generate the document clips 114 to include relatively more import parts of the webpage and exclude relatively less important parts of the webpage, such as parts that may not provide meaningful semantic information about the webpage.

The re-finder application 104 may provide the document clips 114 generated by the document chunking module 116 to the server 106 via the network 108. The server 106 may receive the document clips 114 and may provide the document clips 114 to a data service application 124 that may be running or otherwise executing on the server 106. The data service application 124 may include a document embedding module 126, a concept embedding module 128 and a concept search module 130. The document embedding module 126 may be configured to generate embeddings for the document clips 114 to capture semantics in the document clips 114. In an aspect, the document embedding module 126 may utilize an embedding model 132 to generate embeddings for the document clips 114. In aspects, the embedding model 132 may comprise a machine learning model, such as a transformer model, trained to generate embeddings based on content, where the embeddings capture semantics of the content. In some aspects, a multimodal transformer model may be utilized. The multimodal transformer model is trained based upon multiple modalities (e.g., webpages, file documents, emails chats, etc.) to generate embeddings for the various modalities in the same embedding space. In other aspects, the transformer model may be trained based upon a single modality, such as webpages for example. In some aspects, suitable machine learning models other than a transformer model may be utilized.

The data service application 124 may store the embeddings generated for the document clips 114 in the database 112 so that the embeddings may subsequently be used to determine semantic relationships between the corresponding document clips and concepts that may subsequently be provided by the user 110. In aspects, the data service application 124 may store the embeddings generated for the document clips 114 as part of document metadata 125 that may be included, for example, along with browsing history associated with the user 110 in the database 112. Subsequently, when the user 110 wishes to re-find a webpage previously encountered by the user 110, the user 110 may use the re-finder application 104 to define or otherwise provide one or more concepts 134 for searching for the webpage that may, for example, be in the browsing history associated with the user 110. Such concepts may assist the user 110 to locate a particular webpage that may in a document repository 127 (e.g., in the database 112 or in a repository separate from the database 112), for example. In an aspect, the user 110 may provide a definition of a concept 134 via a concept panel 136 that may be displayed in the graphical user interface 118. In examples, a concept 134 may include one or more concept clips conceptually related to content of the webpage that the user 110 wishes to re-find. The one or more concept clips may include text that the user 110 may obtain from other documents, such as one or more text paragraphs that the user 110 may copy from one or more other webpages that may have been encountered by the user 110 and paste into the concept panel 136. The one or more concept clips may additionally or alternatively include one or more custom text paragraphs that may be entered by the user 110 into the concept panel 136 by the user 110, one or more images that may be provided via the concept panel 136 by the user 110, etc. In some aspects, the user 110 may obtain a concept definition from a concept repository, such as a library, that may store previously defined concepts such as standard concepts and/or saved concepts previously defined by the user 110 and/or users other than the user 110. In some aspects, the user 110 may customize such concepts, for example using the concept panel 136, to make the concepts suited for the search being currently performed by the user 110. As will be explained in more detail below, in various aspects, the user 110 may provide a definition of only a single concept for performing the search, or may provide respective definitions for multiple concepts for performing the search. As will also be explained in more detail below, the user 110 may change or modify concepts and/or may provide additional concepts to refine the search based on search results obtained based on concepts initially provided by the user 110.

The re-finder application 104 may provide the concepts 134 to the data service application 106 via the network 108. The data service application 106 may receive the concepts 134 and may provide the concepts 134 to the concept embedding module 128. The concepts embedding module 128 may generate embeddings for the concepts 134, where the embeddings may capture semantics of concept clips included in the concepts 134. In aspects, the concept embedding module 128 may generate an embedding for a concept 134 based on a combination of embeddings that the concept embedding module 128 may generate for respective concept clips included in the concept 134. The embeddings for the concept clips may be generated by the concept embedding module 128 using a machine learning model, such as a transformer model, that may generate embeddings that capture semantics in the concept clips. In an aspect, the concept embedding module 128 may utilize the embedding model 132 to generate the embeddings for the concept clips included in the concept 134. In other aspects, a separate embedding model may be utilized for generating embeddings for the concept clips included in the concepts 134.

In aspects, the concept embedding module 128 may generate an embedding for a concept 134 as a linear combination of the embeddings generated for the concept clips included in the concept 134. In some aspects, the concept embedding module 128 may generate an embedding for a concept as a weighted linear combination of the embeddings generated for the concept clips included in the concept, where embeddings generated for some concept clips may be weighted higher than embeddings generated for other concept clips. The weights to be used for the embeddings may be provided along with the concept definition by the user 110, for example. In other aspects, the concept embedding module 128 may be configured to determine weights to be used for the embeddings in other suitable manners. In some examples, the concept embedding module 128 may generate an embedding for a concept 134 as an unweighted or equally weighted linear combination of the embeddings generated for the concept clips included in the concept 134 and/or may generate an embedding for a concept 134 based on a non-linear combination of the embeddings generated for the concept clips included in the concept 134.

The concept embeddings generated for the concepts 134 by the concept embedding module 128 may be provided to the concept search module 130. The concept search module 130 may be configured to obtain (e.g., retrieve from the database 112) embeddings generated by the document embedding module 126 for the document clips 114 related to webpages previously encountered by the user 110, and determine semantic relationships between the concepts 134 and the document clips 114 based on i) respective embeddings generated by the document embedding module 126 for the document clips 114 and ii) the concept embedding generated by the concept embedding module 128 for the concepts 134. For example, the concept search module 130 may be configured to determine semantic relationships between a concept 134 and the document clips 114 based on calculated distances between i) respective embeddings generated by the document embedding module 126 for the document clips 114 and ii) a concept embedding generated by the concept embedding module 128 for the concept 134.

The concept search module 130 may provide indications of the determined semantic relationships between the concepts 134 and the document clips 114 to the re-finder application 104. In some aspects, the concept search module 130 may generate a concept canvas for displaying semantic relationships between the concepts 134 and the document clips 114, and may provide the concept canvas display to the re-finder application 104 for display to the user 110. The concept canvas display may comprise a multi-dimensional (e.g., two-dimensional) canvas or map in which representations of the concepts 134 and representations of the document clips 114 may be laid out to display semantic relationships between the concepts 134 and the document clips 114. As will be explained in more detail below, the concept search module 130 may generate a graph having nodes corresponding the document clips 114 and the concepts 134 and edges that represent semantic relationships between the document clips 114 and the concepts 134. As will also be explained in more detail below, the concept search module 130 may then determine a layout for displaying the semantic relationships between the document clips 114 and the concepts 134 using a force-directed graph drawing algorithm based on the graph, where nodes with relatively stronger connections to each other in the graph are attracted to each other with relatively grater forces in the layout of the graph. In other aspects, the layout for displaying the semantic relationships between the document clips 114 and the concepts 134 may be determined in other suitable manners.

The re-finder application 104 may render the concept canvas to the user 110 in a canvas panel 154 of the graphical user interface 118. In aspects, the concept panel 154 may thus display representations of the document clips 114 and representations of the concepts 134, where the representations of the document clips 114 may be positioned in relation to representations of the concepts 134 based on the semantic relationships between the document clips 114 and the concepts 134. Thus, for example, a representation of a document clips 114 that is semantically more similar to a concept 134 may be placed in the canvas panel 154 relatively closer to a representation of the concept 134 in the canvas panel 154 as compared to a representation of a document clip 114 that is semantically less similar to the concept 134.

The user 110 may then browse through the document clips 114 according to the semantic similarity of the document clips 114 to the concepts 134 to locate one or more document clips, e.g., a subset of a documents clip 114, signifying that the one or more document clips may be associated with a webpage that the user 110 is attempting to re-find. In some aspects, the graphical user interface 118 may allow the user 110 to click on, hover over, or otherwise engage with representations of document clips 114 in the canvas panel 154 to view content of the document clips 114 to browse through the document clips 114. In other aspects, the graphical user interface 118 may allow the user 110 to browse through the document clips 114 in other suitable manners. In aspects, the graphical user interface 118 may display webpages (e.g., retrieved from the document repository 127) associated with the document clips 114 selected by the user 110, to allow the user 110 to browse through the webpages associated with the document clips 114.

In some aspects, the graphical user interface 118 may be operable to enable the user 110 to interactively reposition representations of the concepts 134 in the canvas panel 154. For example, the graphical user interface 118 may be operable to enable the user 110 to drag a representation of a concept 134 to a new location in the canvas panel 154. As the user 110 is repositioning the representation of the concept 134 in the canvas panel 154, the re-finder application 104 may dynamically update locations of the representations of the document clips 114 in the canvas panel 154 based on the changing location of the representation of the concept 134. Thus, as the user 110 is repositioning a representation of a concept 134 in the concept panel 154, the representation of document clips 114 that are relatively more semantically similar to the concept 134 may be visually attracted to the representation of the concept 134 in the concept panel 154 and representations of document clips that are relatively less semantically similar to the concept 154 may be visually repelled from the representation of the concept 134 in the concept panel 154. The user may thus reposition the representations of concepts 134 in the graphical user interface 118 to organize the document clips 114 according to content that may be conceptually of interest to the user. In some aspects, the re-finder application 104 may allow the user 110 to modify the concepts 134 based on the search results displayed in the concept canvas 154. For example, the user 110 may modify content of, delete and/or adjust importance (e.g., weights) of one or more concept clips included in a concept 134 and/or may provide one or more additional concept clips to be included in the concept 134. As another example, the user 110 may entirely delete one or more concept 134 and/or may add one or more additional concepts 134. The re-finder application 104 may update the display in the canvas panel 154 based on the modified concept definitions provided by the user 110. These and other techniques described herein may enable the user 110 to re-find documents that would have been more difficult or not possible to re-find using traditional re-finding techniques, such as using a traditional keyword searches to locate documents having the content of interest to the user.

Referring still to FIG. 1, it should be appreciated that while the document chunking module 116 is illustrated in FIG. 1 as being a part of a re-finder application executing or otherwise running on the user device 102, the document chunking module 116 may be at least partially executed on the server 106 in some aspects. Similarly, it should be appreciated that while the document embedding module 126, the concept embedding module 128 and the concept search module 130 are illustrated in FIG. 1 as being parts of a data service application executing or otherwise running on the server 106, the document embedding module 126, the concept embedding module 128 and/or the concept search module 130 may be at least partially executed at the re-finder application 104 of the user device 102 in some aspects. For example, the document embedding module 126 may at least partially operate to generate embeddings locally at the re-finder application 104 executing or otherwise running on the user device 102. Moreover, the concept embedding module 128 and/or the concept search module 130 may at least partially reside at the re-finder application executing or otherwise running on the user device 102.

Figure 2:
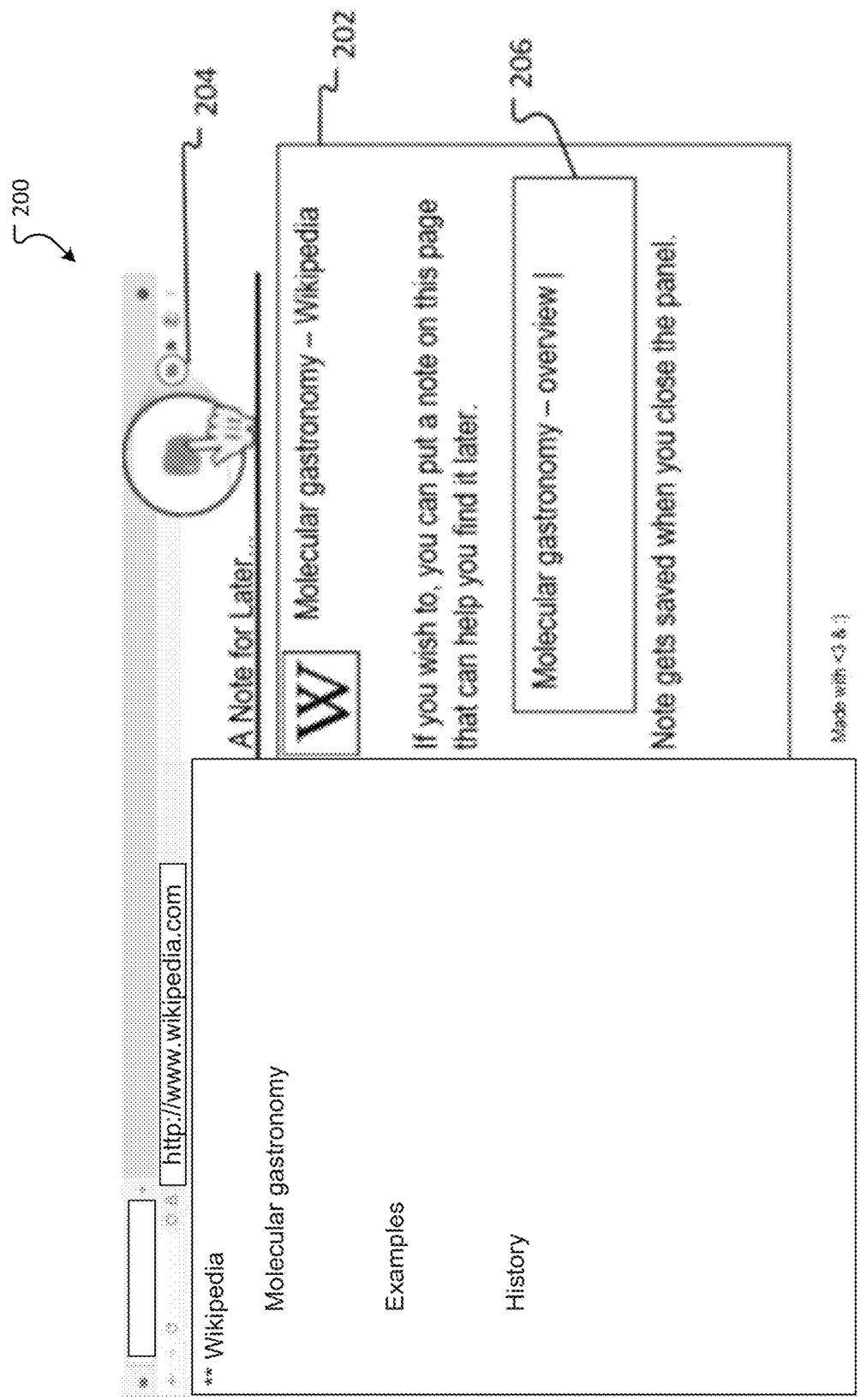
FIG. 2 illustrates an example graphical user interface for providing user annotations for webpages, in accordance with aspects of the present disclosure.

FIG. 2 illustrates an example of a graphical user interface 200 configured to enable a user to provide document (e.g., webpage) annotations, in accordance with aspects of the present disclosure. The graphical user interface 200 may be utilized with the system 100 of FIG. 1, and the graphical user interface 200 is described for exemplary purposes with reference to the system 100 of FIG. 1. In other aspects, the graphical user interface 200 may be utilized with systems different from the system 100 of FIG. 1.

The graphical user interface 200 may be provided as an extension to an internet search application, such as an internet browser, for example. In an aspect, the graphical user interface 200 may be displayed on the user device 102 of FIG. 1 as the user 110 visits webpage using a browser executing or otherwise running on the user device 102. The graphical user interface 200 may include a bar (e.g., a sidebar) 202 for providing notes or other annotations for webpages encountered by the user 110. The bar 202 may be displayed to the user 110 when the user 110 clicks on or otherwise engages with an icon 204 that may be provided, for example, as extension to the browser being utilized by the user 102. The bar 202 may include an area (e.g., a box) 206 for entering custom information, such as notes or other annotations that the user 110 may wish to add about a webpage to facilitate subsequent re-finding of the webpage. In an aspect, such notes may be included in document clips 114 associated with the webpage. For example, the document chunking module 116 may include the note or other annotation provided by the user 110 as one or more document clips 114 generated for the webpage, along with one or more document clips 114 generated based on the content of the webpage. In this way, the custom information entered by the user 110 may subsequently be used in a semantic concept search assist the user 110 in re-finding the webpage.

Figure 3:
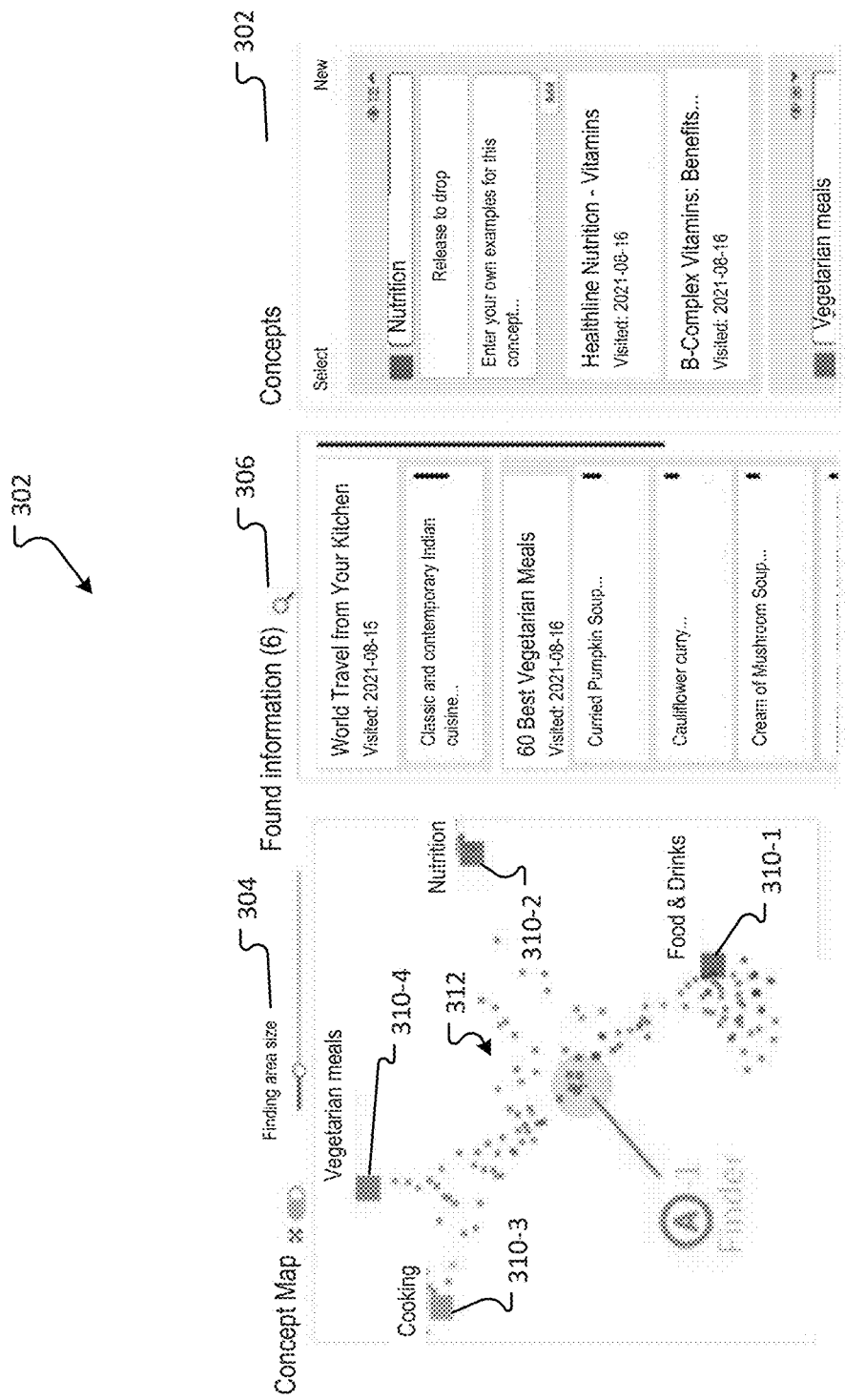
FIG. 3 illustrates an example graphical user interface of a re-finder application, in accordance with aspects of the present disclosure.

FIG. 3 illustrates an example graphical user interface 300 of a re-finder application, in accordance with aspects of the present disclosure. In an aspect, the graphical user interface 300 corresponds to the graphical user interface 118 of the re-finder application 104 of FIG. 1. In another aspect, the graphical user interface 300 may be provided by a re-finder application different from the re-finder application 104 of FIG. 1.

Figure 4:
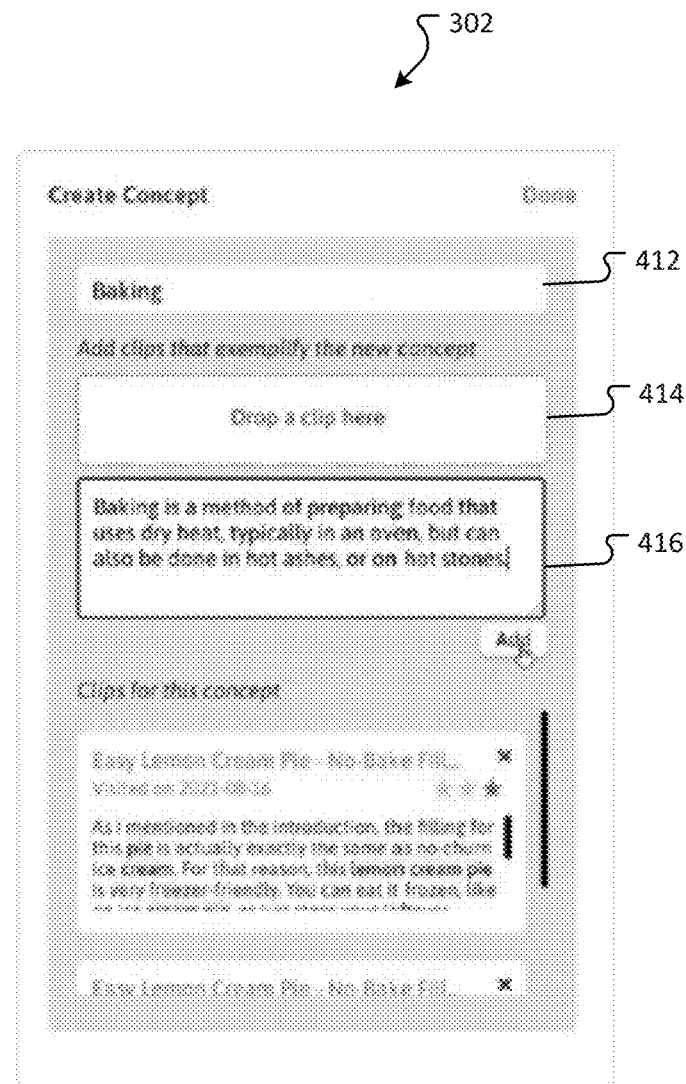
FIG. 4 illustrates an example concept panel of a graphical user interface for creating concepts, in accordance with aspects of the present disclosure.

The graphical user interface 300 may include a concept panel 302, a canvas panel 304 and a detail panel 306. In aspects, the concept panel 302 may allow a user to create and/or manipulate one or more concepts 310 for searching through browsing history of the user. Referring briefly to FIG. 4, the concept panel 302 may include a concept title field 412, a drop box 414 and a custom text box 416 that may be utilized for creation of a concept 310. The user may enter a title for the concept 310 into the concept field 410, and may define one or more concept clips for the concept 310 using the drop box 414 and/or the custom text box 416. For example, the user may use the drag and drop box 414 to copy text or image from another document, such as another webpage, the user may wish to be included as a concept clip in the concept 310. The user may additionally or alternatively enter custom text, such as a written paragraph to be included as a concept clip in the concept 310, into the custom text box 414 for the concept 310. In some aspects, the concept panel 302 may additionally allow the user to specify weights to be used for each of the one or more concept clips. The weights may signify relative importance of the respective concept clips to the concept 310. In aspects, weights may be utilized when generating a concept embedding based on embeddings generated for the corresponding concept clips.

Figure 5:
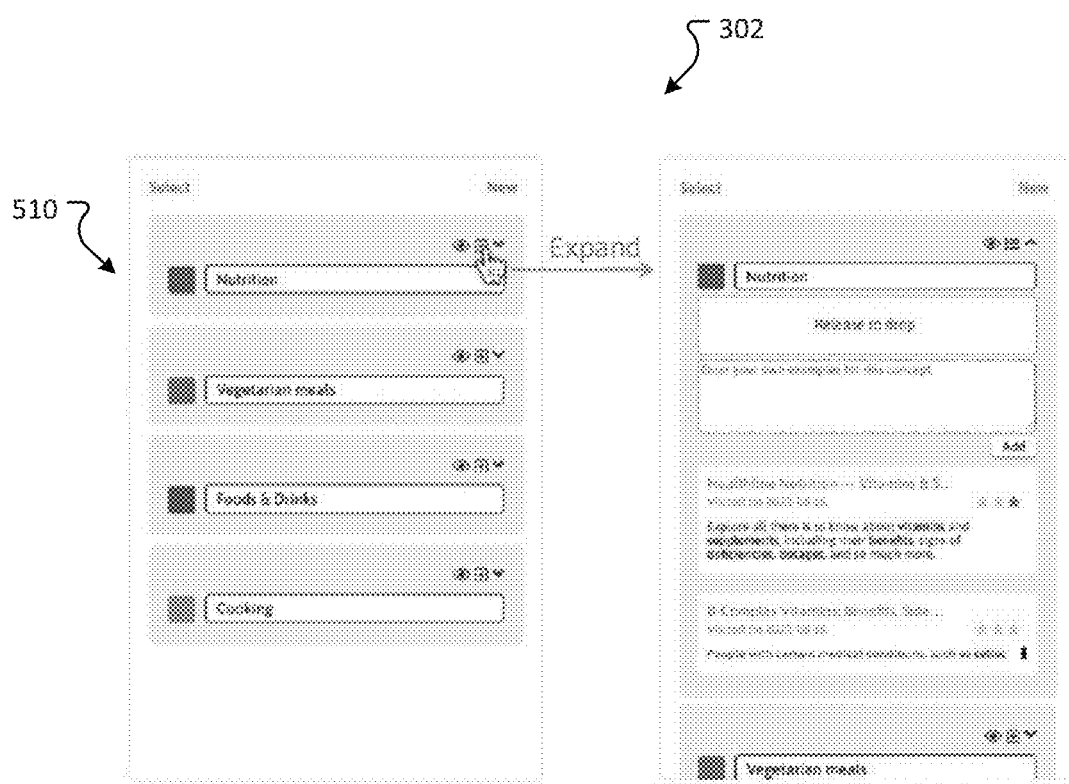
FIG. 5 illustrates an example concept panel of a graphical user interface for viewing and/or manipulating concepts, in accordance with aspects of the present disclosure.

Referring now briefly to FIG. 5, the concepts 310 created by the user may be displayed as expandable menus 510 in the concept panel 302. The user may click on a plus sign associated with a concept 310 to expand the view of the concept 310 in the concept panel 302. The user may then manipulate one or more concept clips in the expanded view of the concept 310. For example, the user may modify content of and/or delete one or more concept clips from the concept 310. As another example, the user may adjust weights of one or more concept clips included in the concept 310. As yet another example, the user may provide one or more additional concept clips for the concept 310. In some aspects, the user may additionally or alternatively entirely delete one or more concepts 310 from the search and/or add one or more additional concepts 310 to the search. In aspects, as will be explained in more detail below, such manipulations of the concepts 310 may be performed by the user to refine an initial search performed based on initially defined one or more concepts 310 by the user.

Referring back to FIG. 3, the canvas panel 304 may display representations of the concepts 310 provided for a search by the user and representations of clips 312 that may be semantically similar to respective ones of the concepts 310 provided by the user. The representations of clips 312 may include representation of document clips (e.g., document clips 114 of FIG. 1) generated for webpages in the browsing history associated with the user. The clips 312 may additionally include concept clips included in the concepts 310. In the example illustrated in FIG. 3, concepts 310 are represented by larger squares in the canvas panel 304 and clip 312 are presented by the smaller squares in the canvas panel 304. In some aspects, representations of concept clips included in a concept 310 may be visually displayed as related to the representation of the concept 310. For example, representations of concept clips included in a concept 310 may be of same color as the representation of the concept 310.

In an aspect, the representations of the clips 312 may be positioned in relation to each other in the canvas panel 304 based on degrees of semantic similarity between the clips 312 and may further be arranged based on degrees of semantic similarities between the clips 312 and the concepts 310 in the canvas panel 304. For example, locations of the representations of the clips 312 in the canvas panel 304 may be determined based on distances between embeddings generated (e.g., by the document embedding module 126 and/or concept embedding module 128 of FIG. 1) for the respective clips 312 and further based on distances between the embedding generated for the clips 312 and embeddings generated (e.g., by the concept embedding module 128 of FIG. 1) for the concepts 310. The user may thus view clips 312 that may be semantically similar each other and further semantically similar to multiple concepts 310 and/or semantically more similar to a particular concept 310 than other ones of the concepts 310. The user may thus attempt to locate a webpage based on sematic similarities and/or dissimilarities of clips 312 associated with the webpage to respective ones of the concepts 310. In the example illustrated in FIG. 3, the user has provided four concepts 310 for the search, including a "foods and drinks" concept 310-1, a "nutrition" concept 310-2, a "cooking" concept 310-3 and a "vegetarian meals" concept 310-4. If the user is attempting to re-find a webpage about both nutrition and feed and drink, the user may wish to view clips 312 that are positioned in an area in the canvas panel 304 that may be at least substantially equidistant between the position of the concept "nutrition" 310-1 and the concept "food and drink" 310-2 in the canvas panel 304. On the other hand, if the user is attempting to find a webpage that is about food and drink but not about nutrition, then the user may wish to view clips 312 that are positioned in an area in the canvas panel 304 that is closer to the concept "food and drink" 310-2 and farther away from the concept "nutrition" in the canvas panel 304.

In some aspects, the user may wish to refine a search by manipulating (e.g., changing or deleting) one or more concepts 310 initially provided by the user and/or by providing one or more additional concepts 310. As an example, the concept "nutrition" 310-2 may be provided by the user after viewing initial search results in the canvas panel 304 in order to "pull way" or separate clips 312 that are semantically more closely related to nutrition from the clips 312 that are more semantically related to the concept "food and drink" but not "nutrition." In response to the user modifying, deleting and/or adding a concept 310, the re-finder application 104 may update the canvas panel 304 based on semantic relationships determined based on the clips 312 and the new definition of the concepts 310. For example, if a representation of a first concept (e.g., the "food and drink" concept 310-1) is placed at a first location in the canvas panel 304 and subsequently a representation of a second concept (e.g., the "nutrition" concept 310-2) is placed at a second location in the canvas panel 304, updated locations of the representations of the clips 312 in the canvas panel 304 may be determined based on i) the first location of the representation of the first concept (e.g., the "food and drink" concept 310-1) in the in the canvas panel 304, ii) calculated distances between the embeddings generated for the corresponding clips 312 and the first concept embedding, iii) the second location of the representation of the second concept (e.g., the "nutrition" concept 310-2) in the in the canvas panel 304 and iv) calculated distances between the embeddings 312 generated for the corresponding clips and the second concept embedding. The re-finder application 104 may then move the representations of clips 312 to the updated locations. The user may thus more easily locate a webpage if the webpage that the user is attempting to re-find is related to the first concept (e.g., food and drink) but not the second concept (e.g., nutrition).

In an aspect, the positions of the representations of the clips 312 relative to each other in the canvas panel 304 may be determined (e.g., by the concept search module 130 of FIG. 1) based on an undirected graph of the clips 312. In some aspects, types of graphs other than an undirected graph may be utilized. For example, in an aspect, a directed graph may be utilized. In generating a graph of the clips 312, the concept search module 130 may place the clips 312 as nodes in the graph and may add edges based on distances between embeddings generated for the clips 312. In an aspect, the concept search module 130 may add edges between nodes corresponding to clips 312 having similarity (e.g., cosine similarity) greater than a particular (e.g., predetermined) threshold. For example, the concept search module 130 may add edges between nodes corresponding to clips 312 having similarity (e.g., cosine similarity) greater than zero. In another aspect, a suitable threshold greater than zero may be utilized. In some aspects, the concept search module 130 may perform sampling of edges in the graph in order to reduce the number of edges and, accordingly, to reduce the complexity of the graph. For example, for each node in the graph, the concept search module 130 may reduce the number of edges that connect to the node such that the total number of edges connecting to the node is k % of all edges connecting to all of the nodes in the graph. In this way, the concept search module 130 may proportionally sample k % of all edges in the graph. Thus, in an aspect, if the number of edges in the graph $O(N^2)$, then the number of sampled edges is $k/100*O(N^2)$. In an example, the value of k is 1. In this example, the concept search module 130 may proportionally sample 1% of all edges in the graph. In at least some aspects, this sampling may provide a balanced trade-off between computational time and power needed to determine the edges and accurate representation of the relationships between the nodes, so that locations of the representations of the clips 312 may be updated with responsive, interactive rates when the user 110 is repositioning a concept 310 on the canvas panel 304, for example. In other aspects, other suitable values of k are utilized and, according, other suitable percentages of all edges are sampled.

In an aspect, the concept search module 130 may compute a layout for displaying the representations of the clips 312 in the canvas panel 304 using a force-directed graph drawing algorithm based on the graph, where nodes with relatively stronger connections to each other in the graph are attracted to each other with relatively grater forces in the layout of the graph. In this way, representations of clips 312 that are relatively more similar to each other are positioned closer to each other in the canvas panel 304, and representations of clips 312 with sufficiently large degrees of similarity may form clusters in the canvas panel 304. To provide a visualization of similarities between clips 312 and concepts 310 in the canvas panel 304, the concept search module 130 may further add concepts 310 as nodes to the underlying graph used for computing the layout of the display in the canvas panel 304. Upon adding a concept 310 as a node to the graph, the concept search module 130 may connect the node corresponding to the concept 310 to other nodes in the graph based on sematic similarity between the concept 310 and the clips 312 corresponding to the other nodes in the graph. In an aspect, the concept search module 130 connects the node corresponding to the concept 310 to m other nodes in the graph with relatively greater semantic similarities between the concept 310 and the clips 312 corresponding to the other nodes in the graph. In an example, the value of m is 25. In this example, the concept search module 130 connects the node corresponding to the concept 310 to 25 other nodes in the graph with relatively greater semantic similarities between the concept 310 and the clips 312 corresponding to the other nodes in the graph. Connecting each node corresponding to each concept 312 to 25 other nodes in the graph with relatively greater semantic similarities between the concept 310 and the clips 312 corresponding to the other nodes in the graph may provide a balanced trade-off between computing time and usefulness of the layout of the graph.

In aspects, the concept search module 130 may generally treat locations of the representations of concepts 310 as fixed locations on the canvas panel 304 and may use the fixed locations of the representations of concepts 310 as constraints to the force-directed algorithm when determining the layout of the graph in the canvas panel 304. However, as discussed above, the re-finder application 104 may allow the user to interactively move (e.g., drag) the representations of the concepts 310 across the canvas panel 304. As the user interactively moves a representation of a concept 310 to a new location in the canvas panel 304, the re-finder application 104 may update locations of the representations of clips 312 that are connected directly and indirectly to the node corresponding to the concept 310 based on the changing location of the representation of the concept 310. In an aspect, the connections between the node corresponding to the concept 310 may be dynamically updated such that m other nodes with relatively greater semantic similarities to the concept 310 move closer to the new location of the representation of the concept 310. Thus, in an aspect, as the user moves a representation of a concept 310 across the canvas panel 304, representations of clips 312 that are relatively more semantically similar to the concept 310 appear to be attracted to the representation of the concept 310 in the canvas panel 304.

In an aspect, the re-finder application 104 may enable the user to view content of the clips 312 in the canvas panel 304, for example by hovering over or otherwise engaging with a representation of the clips 312 in the canvas panel 304. By browsing through the clips 312 based on the locations of the clips 312 relative to the concepts 310, the user may recognize that a particular clip 312 belongs to a webpage that the user is attempting to re-find. In some aspects, the user may then click on or otherwise engage with the clip 312 to be directed to the webpage.

In some aspects, the re-finder application 104 may display details of one or more clips 312 that may be of interest to the user in the detail panel 306. For example, the user may select an area of interest to the user using a finder tool 344, and the detail panel 306 may display a list of one or more clips 312 that are located in the canvas panel 304 in the area selected by the user. In some aspects, the user may click on or otherwise engage with a representation of a particular clip 312 in the canvas panel 304 to cause a view displaying content of the particular clip 312 to be displayed in the detail panel 306. In some aspects, the detail panel 306 may allow the user to perform keyword query search of the content of clips 312 associated with webpages in the browsing history of the user. In this view, the detail panel 306 may display all clips 312 that include the query provided by the user.

In some aspects, when content of a clip 312 is displayed in the detail panel 304, one or more keywords in the clip 312 may be highlighted to the user. In an aspect, the one or more keywords to be highlighted in a clip 312 may be determined using a machine learning model, such as a transformer based machine learning model, that may identify keywords having corresponding embeddings that are sufficiently close to the embedding of the clip 312. For example, the model may identify one or more keywords in a clip 312 that have embeddings with highest cosine similarity with the embedding of the clip 312. Highlighting identified keywords in a clip 312 in the detail panel 306 may assist the users to more quickly assess importance of the clip 312 and relevancy of content of the clip 312 to the one or concepts 310 provided by the user.

Figure 6:
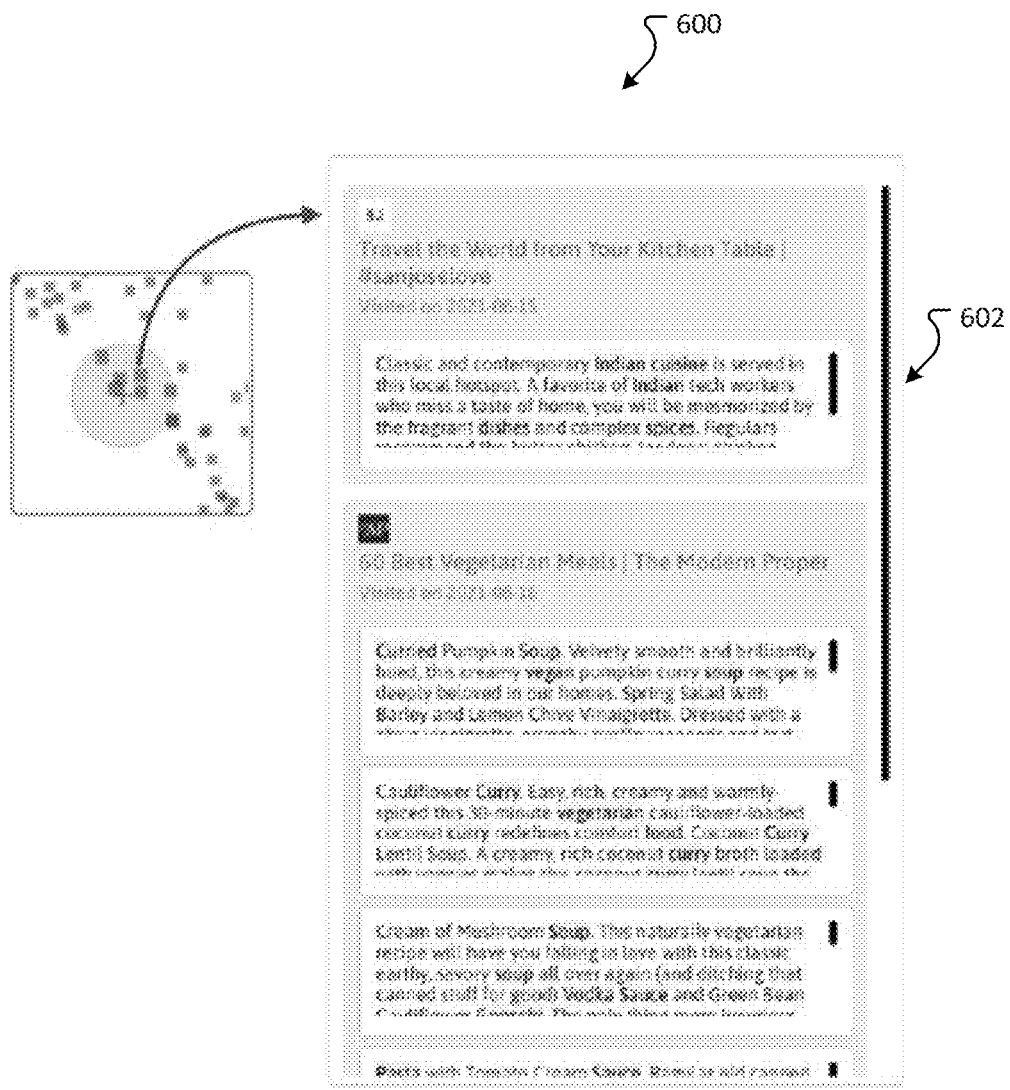
FIG. 6 illustrates an example of a finder panel that may be provided as a detail panel of a graphical user interface, in accordance with aspects of the present disclosure.

FIG. 6 illustrates an example of a finder panel 600 that may be provided as the detail panel 306, in accordance with aspects of the present disclosure. The re-finder application 104 may display the finder panel in response to detecting that the user has positioned the finder tool 344 over a particular area in the canvas panel 304. The finder panel 600 may display content of one or more clips 312 that are located in the particular area in the canvas panel 304 selected by the user. In an aspect, content of clips 312 in the finder panel 600 may be displayed in association with the webpages of which the clips 312 may be a part. For example, content of each clip 312 in the finder panel 600 may be displayed on a respective page card 602 corresponding to the webpage of which the clip 312 is a part. In some aspects, respective page cards 602 in the finder panel 600 may include additional information about the corresponding webpages, such as a title of the webpage, a date and time of the user's last visit to the webpage, etc. In an aspect, if the user wishes to visit a webpage associated with a clip 312, the user may click on a portion of the page card 602 (e.g., displaying the title of the webpage) corresponding to the webpage, and the re-finder application 104 may direct the user to the webpage.

Figure 7:
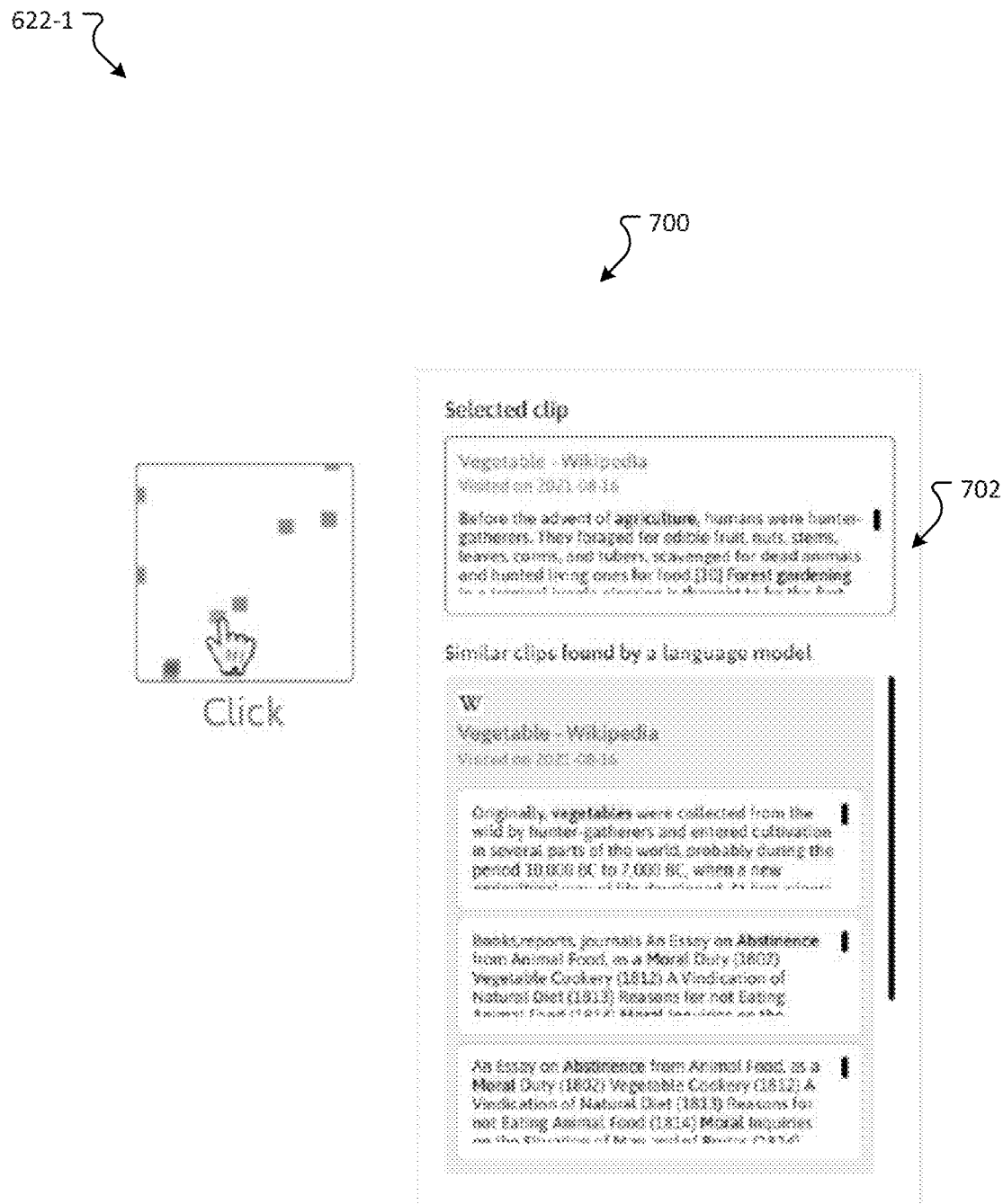
FIG. 7 illustrates an example of a selected clip panel that may be provided as a detail panel of a graphical user interface, in accordance with aspects of the present disclosure.

FIG. 7 illustrates an example of a selected clip panel 700 that may be provided as the detail panel 306, in accordance with aspects of the present disclosure. The re-finder application 104 may display the selected clip panel 700 in response to detecting that the user has clicked on or otherwise engaged with a particular clip 312 in the canvas panel 304. In an aspect, the selected clip panel 700 may display content of the particular clip 312 selected by the user. In some aspects, the selected clip panel 700 may additionally display content of clips 312 that are closely related to the particular clip 312 selected by the user. For example, the selected clip panel 700 may display a predetermined number of clips 312 that are the closest members of the selected clip 312. In an aspect, content of each clip 312 displayed in the selected clip panel 700 may be displayed in association with the webpage associated with the clip 312. For example, as with the finder user interface 600 in FIG. 6, content of each clip 312 in the selected clip panel 700 may be displayed on a respective page card 702. In some aspects, respective page cards 702 in the selected clip panel 700 may include additional information about the corresponding webpages, such as a title of the webpage, a date and time of the user's last visit to the webpage, etc. In an aspect, if the user wishes to visit a webpage associated with a clip 312, the user may click on a portion of the page card 702 (e.g., displaying the title of the webpage) corresponding to the webpage, and the re-finder application 104 may direct the user to the webpage.

Figure 8:
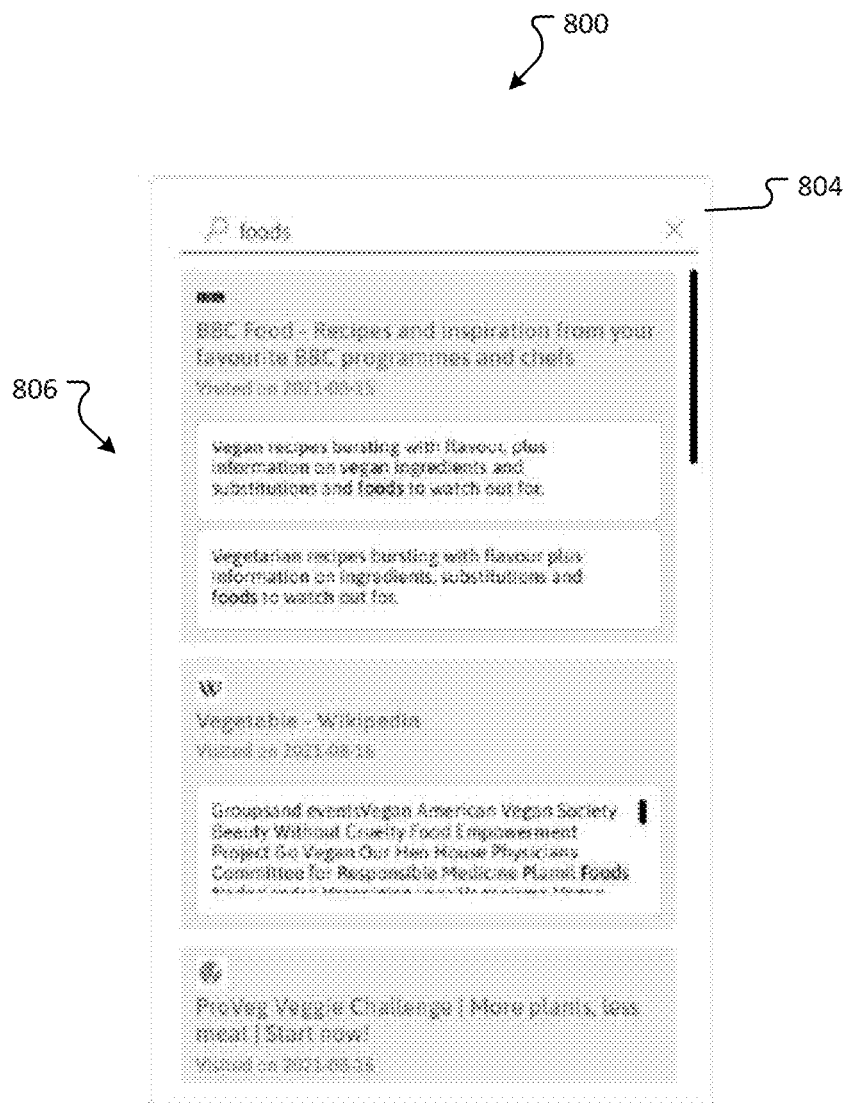
FIG. 8 illustrates an example of a finder panel that may be provided as a detail panel of a graphical user interface, in accordance with aspects of the present disclosure.

FIG. 8 illustrates an example of a keyword search panel 800 that may be provided as the detail panel 306, in accordance with aspects of the present disclosure. In an aspect, the re-finder application 104 may display the keyword search panel 800 in response to detecting that the user has clicked or otherwise engaged with a search icon (not shown) that may be displayed in the detail panel 306. The keyword search panel 800 may include a search box 804 that may allow the user to enter keyword search queries for searching through the browsing history of the user. In response to the user entering a search query in the search box 804, the keyword search panel 800 may display clips 312, associated with webpages in the browsing history of the user, that include text similar to and/or the exact wording of the query. In an aspect, clips 312 that are associated with a particular webpage may be displayed in the keyword search panel 800 on a page card 806 corresponding to the particular webpage. The page card 806 may include additional information about the webpage, such as a title of the webpage, a date and time of the user's last visit to the webpage, etc. In an aspect, if the user wishes to visit the webpage, the user may click on a portion of the page card 806 (e.g., displaying the title of the webpage), and the re-finder application 104 may direct the user to the corresponding webpage.

Figure 9:
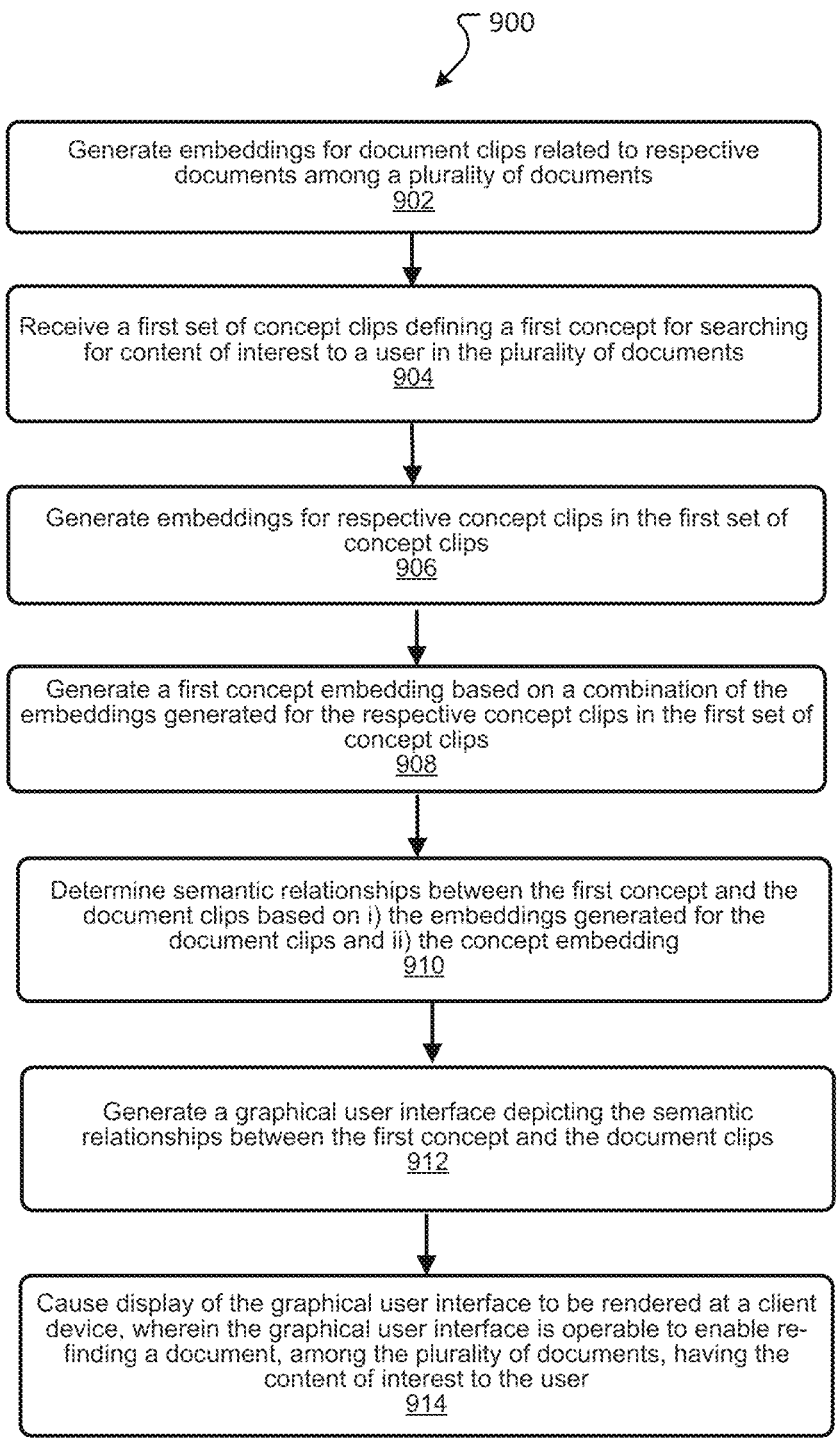
FIG. 9 illustrates details of a method for assisting users in re-finding documents, in accordance with aspects of the present disclosure.

FIG. 9 illustrates details of a method 900 for assisting users in re-finding documents, in accordance with aspects of the present disclosure. A general order for the steps of the method 700 is shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1-8.

At block 902, embeddings are generated for document clips related to respective documents among a plurality of documents. In an aspect, the document clips related a particular document among the plurality of documents include one or more of i) one or more text paragraphs parsed out from the particular document and ii) one or more images from the particular document. In some aspects, the document clips related to the particular document additionally or alternatively include information related to document metadata information, such as information about structure and/or feel (e.g., length of document, number and/or lengths of respective sections (e.g., paragraphs) of the particular document, fonts (e.g., font type, size, color, etc.) used in the particular document, document background color, etc. In some aspects, the document clips related to a particular document include at least one user-defined clip that includes information not extracted from the document. In an aspect, the embeddings for the document clips are generated using a machine learning model, such as a transformer model, configured to capture semantics.

At block 904, a first set of concept clips defining a first concept for searching for content of interest to a user in the plurality of documents. In an aspect, the first set of clips defining the first concept includes one or more of i) one or more custom text paragraphs provided by the user, ii) one or more text paragraphs pasted from one or more documents by the user and iii) one or more images provided by the user. While specific types of content are described herein, one of skill in the art will appreciate the set of clips may include other types of content, such as, for example, video or audio clips.

At block 906, embeddings for respective concept clips in the first set of concept clips are generated. In an aspect, the embeddings for the concept clips are generated using a machine learning model, such as a transformer model, configured to capture meaning of content. While aspects are described as using a transformer model, one of skill in the art will appreciate that other types of machine learning models may be employed with the disclosed aspects. In an example, the embeddings for the concept clips at block 906 are generated using the same machine learning model as used for generating the embeddings for the document clips at block 902. In another example, a different machine learning model is utilized.

At block 908, a first concept embedding based on a combination of the embeddings generated for the respective concept clips in the first set of concept clips. In an example, the first concept embedding is generated as a weighted linear combination of the embeddings for the concept clips generated at block 906. In other example, the first concept embedding based on another suitable combination of the embeddings for the concept clips generated at block 906

At block 910, semantic relationships between the first concept and the document clips are determined based on i) the respective embeddings generated for the document clips and ii) the concept embedding. For example, the sematic relationships are determined based on respective distances (e.g., cosine similarity distances) between i) the respective embeddings generated for the document clips and ii) the concept embedding.

At block 912, a graphical user interface depicting the semantic relationships between the first concept and the document clips is generated. In aspects, generating the graphical user interface at block 912 includes placing representations of the document clips in a multi-dimensional canvas, wherein the representations of the document clips are placed relative to each other based on calculated distances between the embeddings generated for the corresponding document clips. In aspects, generating the graphical user interface further includes placing a representation of the first concept at a first location in the multi-dimensional canvas, determining locations of the representations of the document clips relative to the first location of the representation of the first concept based on calculated distances between the embeddings generated for the corresponding document clips and the first concept embedding, and positioning the representations of the document clips in relation to the representation of the first concept in the multidimensional canvas in accordance to the determined distances. In other aspects, the graphical user interface depicting the semantic relationships between the first concept and the document clips is generated in other suitable manners. At block 914, the graphical user interface is rendered at a client device. The graphical user interface is operable to enable re-finding a document, among the plurality of documents, having the content of interest to the user.

Figure 10:
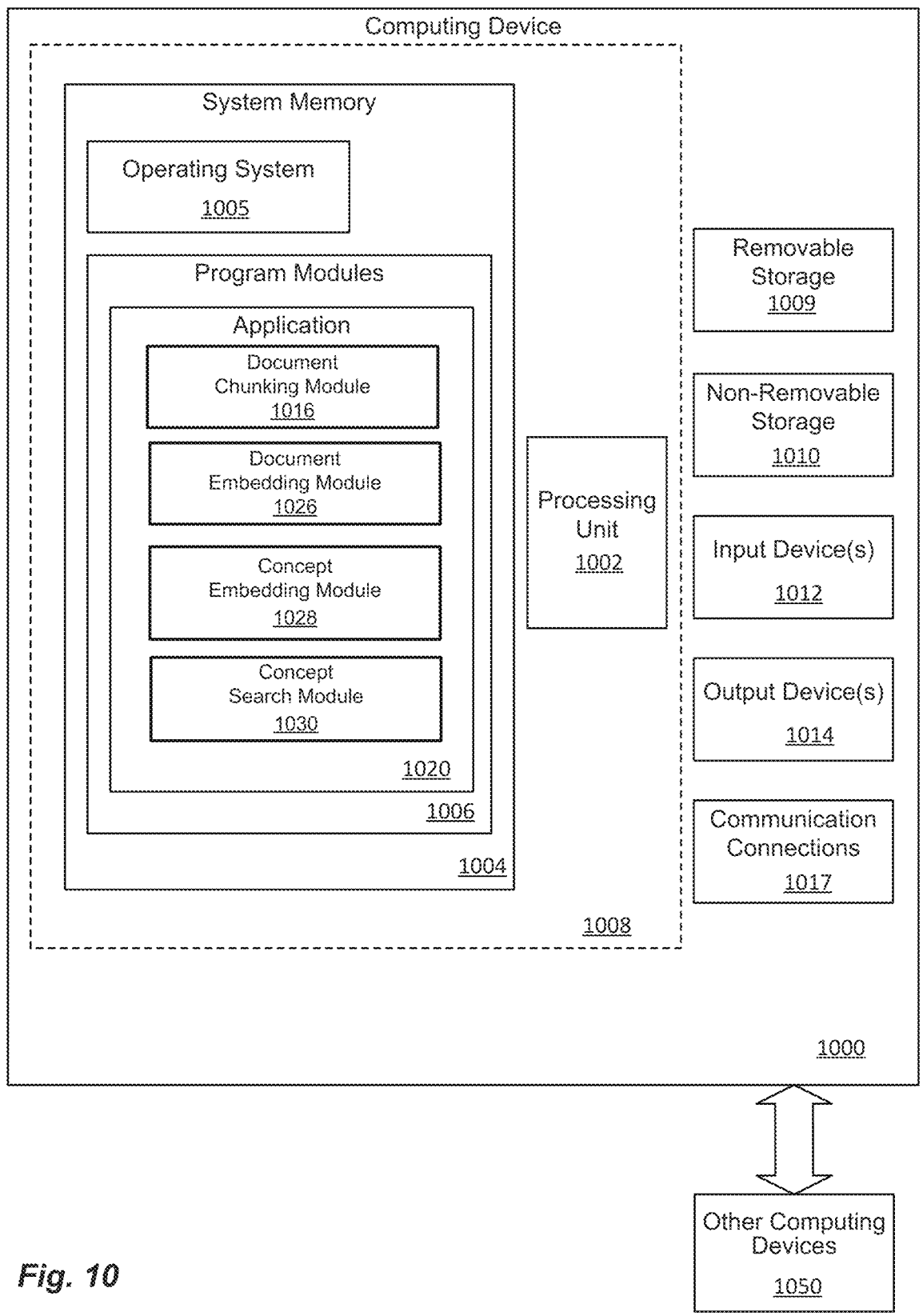
FIG. 10 is a block diagram illustrating physical components (e.g., hardware) of a computing device with which aspects of the disclosure may be practiced.

FIGS. 10-11 and the associated descriptions provide a discussion of a variety of operating environments in which aspects of the disclosure may be practiced. However, the devices and systems illustrated and discussed with respect to FIGS. 10-11 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store a document chunking module 1016 (e.g., corresponding to the document chunking module 126 of FIG. 1), a document embedding module 1026 (e.g., corresponding to the document embedding module 126 of FIG. 1), a concept embedding module 1028 (e.g., corresponding to the concept embedding module 128 of FIG. 1) and/or a concept search module 1030 (e.g., corresponding to the concept search module 130 of FIG. 1). The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the at least one processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1017 allowing communications with other computing devices 1050. Examples of suitable communication connections 1017 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 809, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
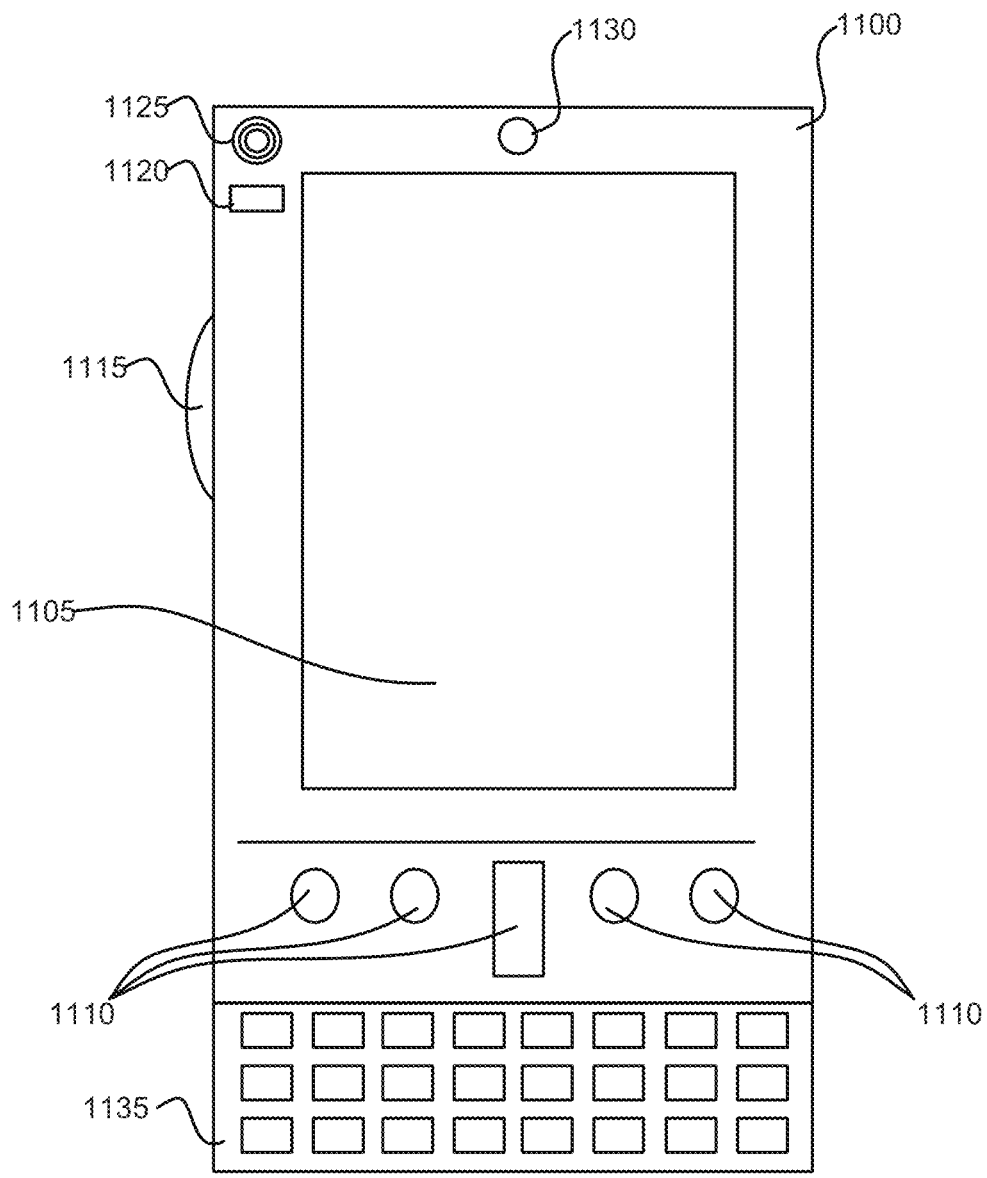
FIGS. 11A-11B illustrate a mobile computing device with which aspects of the disclosure may be practiced.
Figure 11B:
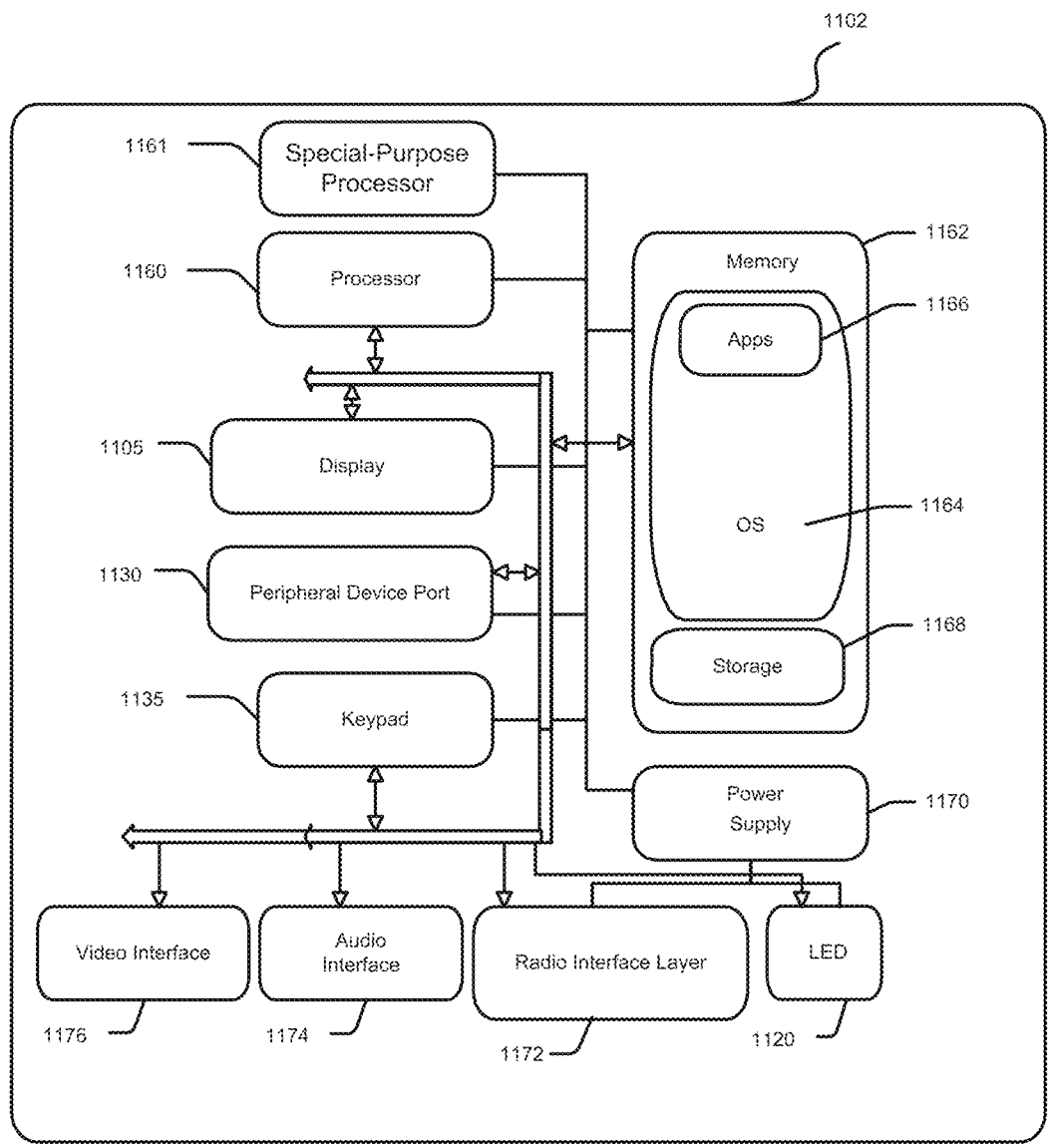

FIGS. 11A-11B illustrate a mobile computing device 1100, for example, a mobile telephone, a smart phone, wearable computer (such as a smart watch), a tablet computer, a laptop computer, and the like, with which aspects of the disclosure may be practiced. In some aspects, the client (e.g., computing system 104A-E) may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external source.

FIG. 11B is a block diagram illustrating the architecture of one aspect of computing device, a server, or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., document chunking module, document embedding module, concept embedding module, concept search module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for assisting users in re-finding documents, the method comprising:
generating, using a machine learning model, embeddings for document clips related to respective documents among a plurality of documents;
receiving a first set of concept clips defining a first concept for searching for content of interest to a user in the plurality of documents;
generating embeddings for respective concept clips in the first set of concept clips;
generating, using the machine learning model, a first concept embedding based on a combination of the embeddings generated for the respective concept clips in the first set of concept clips;

determining semantic relationships between the first concept and the document clips based on i) the embeddings generated for the document clips and ii) the concept embedding;

generating a graphical user interface depicting the semantic relationships between the first concept and the document clips; and causing display of the graphical user interface to be rendered at a client device, wherein the graphical user interface is operable to enable re-finding a document, among the plurality of documents, having the content of interest to the user.

2. The method of claim 1, wherein the plurality of documents comprises a plurality of web pages in a browsing history of the user.

3. The method of claim 1, wherein the document clips related to content of a particular document among the plurality of documents include one or more of i) one or more text paragraphs parsed out from the particular document and ii) one or more images from the particular document.

4. The method of claim 1, wherein the document clips related to content of a particular document include at least one user-defined clip that includes information not extracted from the document.

5. The method of claim 1, wherein the first set of clips defining the first concept includes one or more of i) one or more custom text paragraphs provided by the user, ii) one or more text paragraphs pasted from one or more documents by the user and iii) one or more images provided by the user.

6. The method of claim 1, wherein the embeddings capture semantics of the content.

7. The method of claim 1, wherein generating the first concept embedding comprises generating the first concept embedding based on a weighted combination of the embeddings generated for the respective concept clips in the first set of concept clips.

8. The method of claim 1, wherein generating the graphical user interface includes placing representations of the document clips in a multidimensional canvas, wherein the representations of the document clips are placed relative to each other based on calculated distances between the embeddings generated for the corresponding document clips.

9. The method of claim 8, wherein generating the graphical user interface further comprises:

placing a representation of the first concept at a first location in the multidimensional canvas;

determining locations of the representations of the document clips relative to the first location of the representation of the first concept based on calculated distances between the embeddings generated for the corresponding document clips and the first concept embedding; and positioning the representations of the document clips in relation to the representation of the first concept in the multidimensional canvas in accordance to the determined distances.

10. The method of claim 9, further comprising:

receiving a second set of concept clips defining a second concept for searching for content of interest to the user in the plurality of documents;

placing a representation of the second concept at a second location in the multi-dimensional canvas; and updating locations of the representations of the document clips such that i) representations of document clips that are more semantically similar to the first concept than the second concept are placed closer to the representation of the first concept in the multidimensional canvas and ii) representations of document clips that are more semantically similar to the second concept than the first concept are placed closer to representation of the second concept in the multi-dimensional canvas.

11. The method of claim 10, wherein updating locations of the representations of the document clips comprises:

generating embeddings for respective concept clips in the second set of concept clips;

generating a second concept embedding based on a combination of the embeddings generated for the respective concept clips in the second set of concept clips;

determining updated locations of the representations of the document clips in the multidimensional canvas based on i) the first location of the representation of the first concept in the multidimensional canvas, ii) calculated distances between the embeddings generated for the corresponding document clips and the first concept embedding, iii) the second location of the representation of the second concept in the multidimensional canvas and iv) calculated distances between the embeddings generated for the corresponding document clips and the second concept embedding; and moving the representation of the document clips to the updated locations in the multidimensional canvas.

12. The method of claim 10, further comprising:

detecting that the representation of the first concept has been repositioned to a new location in the multidimensional canvas by the user; and in response to detecting that the representation of the first concept has been repositioned, repositioning representations of the document clips in the multidimensional canvas such that representations of document clips that are more semantically similar to the first concept than the second concept move closer to the new location of the representation of the first concept.

13. A system for assisting users in re-finding documents, the system comprising:

one or more computer readable storage media; and program instructions stored on the one or more computer readable storage media that, when executed by at least one processor, cause the at least one processor to:

generate, using a machine learning model, embeddings for document clips related to respective documents among a plurality of documents;

receive a first set of concept clips defining a first concept for searching for content of interest to a user in the plurality of documents;

generate, using the machine learning model, embeddings for respective concept clips in the first set of concept clips;

generate a first concept embedding based on a combination of the embeddings generated for the respective concept clips in the first set of concept clips;

determine semantic relationships between the first concept and the document clips based on i) the embeddings generated for the document clips and ii) the concept embedding;

generate a graphical user interface depicting the semantic relationships between the first concept and the document clips; and cause display of the graphical user interface to be rendered at a client device, wherein the graphical user interface is operable to enable re-finding a document, among the plurality of documents, having the content of interest to the user.

14. The system of claim 13, wherein the plurality of documents comprises a plurality of web pages in a browsing history of the user.

15. The system of claim 13, wherein the document clips related to content of a particular document among the plurality of documents include one or more of i) one or more text paragraphs parsed out from the particular document ii) one or more images from the particular document and iii) at least one user-defined clip that includes information not extracted from the document.

16. The system of claim 13, wherein the first set of clips defining the first concept includes one or more of i) one or more custom text paragraphs provided by the user, ii) one or more text paragraphs pasted from one or more documents by the user and iii) one or more images provided by the user.

17. The system of claim 13, wherein the instructions, which when executed by the processor, cause the processor to generate the first concept embedding based on a weighted combination of the embeddings generated for the respective concept clips in the first set of concept clips.

18. The system of claim 13, wherein the instructions, which when executed by the processor, cause the processor to generate the graphical user interface at least by:
  placing representations of the document clips in a multidimensional canvas in the graphical user interface, wherein the representations of the document clips are placed relative to each other based on calculated distances between the embeddings generated for the corresponding document clips;
  placing a representation of the first concept at a first location in the multidimensional canvas; determining locations of the representations of the document clips relative to the first location of the representation of the first concept based on calculated distances between the embeddings generated for the corresponding document clips and the first concept embedding; and
  positioning the representations of the document clips in relation to the representation of the first concept in the multidimensional canvas in accordance to the determined distances.

19. A non-transitory computer storage medium comprising computer executable instructions, which when executed by at least one processor, perform a method comprising:
  generating, using a machine learning model, embeddings for document clips related to respective documents among a plurality of documents;
  receiving a first set of concept clips defining a first concept for searching for content of interest to a user in the plurality of documents;
  generating, using the machine learning model, embeddings for respective concept clips in the first set of concept clips;
  generating a first concept embedding based on a combination of the embeddings generated for the respective concept clips in the first set of concept clips;
  determining semantic relationships between the first concept and the document clips based on i) the embeddings generated for the document clips and ii) the concept embedding;
  generating a graphical user interface depicting the semantic relationships between the first concept and the document clips; and
  causing display of the graphical user interface to be rendered at a client device, wherein the graphical user interface is operable to enable re-finding a document, among the plurality of documents, having the content of interest to the user.

20. The computer storage medium of claim 19, wherein the method further comprises:
  placing representations of the document clips in a multidimensional canvas in the graphical user interface, wherein the representations of the document clips are placed relative to each other based on calculated distances between the embeddings generated for the corresponding document clips;
  placing a representation of the first concept at a first location in the multidimensional canvas; determining locations of the representations of the document clips relative to the first location of the representation of the first concept based on calculated distances between the embeddings generated for the corresponding document clips and the first concept embedding; and
  positioning the representations of the document clips in relation to the representation of the first concept in the multidimensional canvas in accordance to the determined distances.

\* \* \* \* \*